United States Patent [19]

Franey et al.

[11] Patent Number: 4,481,255

[45] Date of Patent: Nov. 6, 1984

[54] RADIATION HARDENED TRANSFER MEDIUM

[75] Inventors: Terence E. Franey, Lexington; Richard B. Watkins, Frankfort; Austin W. Woolfolk, Lexington, all of Ky.

[73] Assignee: International Business Machines Corporation, Armonk, N.Y.

[21] Appl. No.: 376,344

[22] Filed: May 10, 1982

[51] Int. Cl.[3] ........................ B32B 27/08; B32B 5/18; C09J 7/02; B41M 5/10

[52] U.S. Cl. .................................... 428/355; 428/327; 428/408; 428/497; 428/520; 428/523; 427/35; 427/146

[58] Field of Search ............... 428/327, 355, 497, 408, 428/520, 523

[56] References Cited

U.S. PATENT DOCUMENTS

| | | | |
|---|---|---|---|
| 2,907,675 | 10/1959 | Gaylord | 427/44 |
| 3,754,966 | 8/1973 | Newman et al. | 428/307 |
| 3,825,437 | 7/1974 | Blair et al. | 428/474.4 |
| 3,825,470 | 7/1974 | Elbert et al. | 428/474.4 |
| 3,954,495 | 5/1976 | Osswald et al. | 106/307 |
| 3,993,832 | 11/1976 | Newman | 428/307 |
| 4,093,772 | 6/1978 | Taylor et al. | 428/355 X |
| 4,242,402 | 12/1980 | Korpman | 428/355 X |
| 4,312,916 | 1/1982 | Kakumaru et al. | 428/355 X |

FOREIGN PATENT DOCUMENTS

| | | | |
|---|---|---|---|
| 1964747 | 7/1971 | Fed. Rep. of Germany | 428/355 |
| 2030187 | 4/1980 | United Kingdom . | |

OTHER PUBLICATIONS

IBM Technical Disclosure Bulletin, C. W. Anderson and H. T. Findlay, "Thermal Ink Transfer Aid", vol. 23, No. 12, May 1981, p. 5463.

*Primary Examiner*—Patricia C. Ives
*Attorney, Agent, or Firm*—John A. Brady

[57] ABSTRACT

A formula and process to manufacture a lift-off correctable film ribbon in which the transfer layer is cured by an electron beam. The radiation curing eliminates solvents and their associated handling and pollution problems. The polymerizable ingredients are acrylic acrylate and N-vinyl-2-pyrrolidone. The formula also includes powdered polyperfluoroethylene, mineral oil, and carbon black.

43 Claims, 2 Drawing Figures

RADIATION HARDENED TRANSFER MEDIUM

TECHNICAL FIELD

This invention relates to transfer media for printing, particularly typewriter ribbons for typing with a typewriter. Printing from the transfer medium of this invention is particularly adapted to correction by being lifted-off bodily by an adhesive which is impacted against the printed character. Such lift-off correction employing adhesive is now generally well known in the art. The marking material of this invention is achieved by radiation hardening a mixture including polymerizable materials.

BACKGROUND ART

Illustrative transfer mediums for lift-off correction not involving radiation hardening are disclosed in U.S. Pat. Nos. 3,825,470 to Elbert et al and 3,825,437 to Blair. The disclosures of these patents recognize the requirement that the ink material of the transfer medium for lift-off correction by an adhesive be coherent as printed and be cohesive to itself in preference to the paper printed upon during the lift-off step. The disclosures of these patents show formulations which include mineral oil. The formulas of these patents are applied as a solvent solution and the solvent is then expelled to achieve hardening.

Radiation hardening of polymerizable polymers to form laminations is known in the art in various forms. Illustrative of such state of the art is the U.S. Pat. No. 2,907,675 to Gaylord, issued in 1959. The radiation in the Gaylord is an electron beam. The use of radiation hardening to form a transfer medium, specifically an electron beam, is shown in U.S. Pat. No. 3,754,966 to Newman et al. In that patent, the ink composition is a liquid mixture including mineral oil and certain polymerizable acrylates, none of those acrylates being the acrylic acrylate employed in the invention described here.

An inherent and well recognized advantage of radiation hardening to obtain a final product is that no materials are expelled from the product which might find their way into the atmosphere and act as a pollutant. In a solvent-applied process, for example, solvent must be recovered to prevent it from going into the atmosphere and such recovery may be imperfect even when the most advanced and expensive recovery equipment is employed. The foregoing and other prior art known does not encompass a lift-off correctable transfer medium made by radiation hardening.

Acrylic acrylate has recently become available for purchase and is known as a low cohesive strength material which polymerizes to a solid.

The specific embodiment of this invention includes perfluoroethylene powder to facilitate release during printing in a character image. Such a use is disclosed generally in an *IBM Technical Disclosure Bulletin* article entitled "Thermal Ink Transfer Aid," by C. W. Anderson and H. T. Findlay, Vol. 23, No. 12, May 1981, at page 5463.

DISCLOSURE OF THE INVENTION

In accordance with this invention a process is disclosed employing a formula to achieve the transfer layer of a transfer medium cured by ionizing radiation, specifically by an electron beam. The use of radiation eliminates solvents and their associated handling and pollution effects. The formula employed yields a final transfer layer of marking material having the necessary characteristics for both good quality printing and lift-off correction by application and pulling away of an adhesive material in the standard manner presently employed in commercially available typewriters.

Primary significance in the formula is the use of acrylic acrylate. That material provides low adhesion to the substrate and desirable viscosity properties to the mix applied to be polymerized. Acrylic acrylate polymerizes well under the radiation to a material which both prints well under pressure and is cohesive. Also of major significance is the use in the formula of N-vinyl-2-pyrrolidone, also a polymerizable material, which dilutes the formula and polymerizes without adhering to the substrate. The formula also contains an incompatible powder, which modifies the cohesive property of the final resin; a pigment, and an oil. A mixture of these materials is a paste. It is applied to a substrate as a film, and then passed under a conventional source of electron beam radiation until substantially fully polymerized at the unsaturated sites of both the acrylic ingredient and the pyrrolidone.

Electron-beam radiation functions well in the formula having a carbon black pigment. The use of ultra violet radiation with a formula containing an initiator ionized by ultra violet appears potentially practical, although collateral heat is generated and the ultra violet radiation may not fully penetrate the coating.

BEST MODE FOR CARRYING OUT THE INVENTION

The preferred embodiment is a correctable ribbon to be lifted-off by an adhesive after having been printed. Two necessary properties of such a ribbon, as is well understood by the art, are required: (1) low adhesion to the substrate of the transfer medium to provide for total transfer of the character during a normal printing by impact from a type die or other print element, and (2) high cohesive strength of a printed character to allow total liftoff on correction. Necessarily, the cohesive strength must be at a level which is not so high as to prevent the printing. This invention achieves these properties by employing a formula which is a mixture of two reactive species, two inert species, and an incompatible species.

Figure 1:
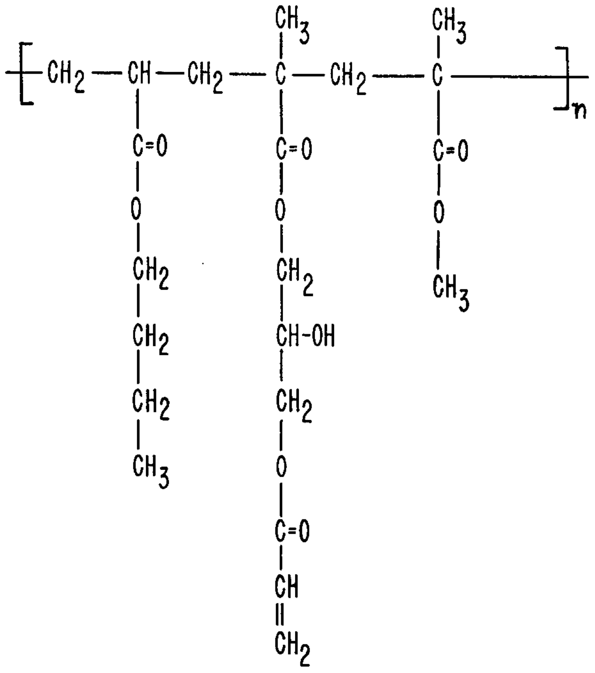
FIG. 1 is a structural diagram generally descriptive of the acrylic acrylate of the preferred embodiment.

The reactive species are chemicals which possess an unsaturation which upon electron-beam impact will polymerize with other unsaturated chemicals through a free-radical mechanism. One of the two materials is acrylic acrylate. Acrylic acrylate is an oligomer composed of any combination of acrylic monomers plus a glycidyl acrylate which is subsequently acrylated via the addition of acrylic acid, the unsaturated site of which being the reactive sites for further curing. The specific acrylic acrylate used has a mixture of butyl acrylate, methyl methacrylate and the glycidyl methacrylate monomers polymerized at their unsaturated sites with the subsequent acrylation. The butyl acrylate is the major monomer in the oligomer backbone. An acrylic acrylate unit having the three molecules is shown in a conventional chemical structural diagram in FIG. 1. The butyl acrylate monomer is actually the major element, being more in weight than the combined weights of the methyl methacrylate and the glycidyl methacrylate. The acrylated glycidyl methacrylate is a side chain off the oligomer backbone. This material used in a product supplied by Celanese Chemical Co. under the trade name Celrad 1700.

Acrylic acrylate has recently become available for purchase and is known as a polymerizing material which polymerizes to a low cohesive solid. This property is used in that the final marking layer achieved breaks away well under typing impact to give printing with good image definition.

The second species of the active material is N-vinyl-2-pyrrolidone. That material, of course, has a double-bond element connected chemically to the nitrogen of a five membered ring. That double-bond site is well adapted for free radical polymerization under initiation from an electron beam. Pyrrolidone has a high surface energy which greatly lowers the adhesion of the cured ink to the transfer medium substrate, in this specific case, polyethylene. Other monomers such as acrylate monomers generally have lower surface energy, and therefore tend to graft to the substrate during curing to unacceptably increase adhesion.

Mineral oil in the formula is incompatible with the other materials in the formula. It is employed to reduce the adhesion to the substrate beyond the reduction achieved by the acrylic acrylate and pyrrolidone. It is understood to operate by a different mechanism than that of the acrylic acrylate and pyrrolidone in that the mineral oil forms an interfacial boundary between the ink and the substrate to thereby lower the adhesion of the substrate to the ink. Other oils incompatible with other materials in a particular formula and of suitable viscosity would be expected to be useful in place of mineral oil.

Two inert solid materials are in the formula. One is carbon black in finely divided form. This is a standard pigment to provide a black color to the ink of high density. Where long pot life is a factor, acid carbon black is not used as it initiates polymerization of the pyrrolidone.

The second inert solid material is a polyperfluoroethylene powder, a polyperfluoro alkane. This is as finely divided as is possible to achieve by ordinary techniques. The material used has a nominal diameter of 2 microns. This material has the well known characteristic of being one of the lowest surface-energy materials known. It is inert and it tends to reject most materials. This powder is understood to act as a stress concentrator which provides for clean, sharp edges of the characters created by impact printing on the transfer medium. Other solid powders of material which tend to reject the resin would be expected to function similarly in place of the polyperfluoro alkane, but the perfluoro alkane absorbs little mineral oil, while the great majority of possible alternative materials would absorb some mineral oil.

Both the polyperfluoroethylene powder and the carbon black are thoroughly dispersed in the ink layer and are held so dispersed in the polymerized material produced by electron beam radiation.

The formula of five ingredients as indicated thoroughly mixed is coated on high-density polyethylene sheet to a thickness of 5 microns, and then radiation cured. Shrinking is minimal and the final thickness after radiation curing is also substantially that of the coated thickness. The final result is a transfer or marking layer on the polyethylene substrate. This is typically a bulk size which is slit by standard techniques to the width desired for use as a typewriter ribbon or other transfer element for a specific printer. The slit ribbon, comprising the ink layer and the polyethylene substrate, is then wound onto a spool or otherwise packed as is appropriate for the specific typewriter or other printer for which it is to be used.

A polypropylene substrate also functions well. The formulas as described would be expected to not adhere unduly to any non-polar organic substrate.

The radiation curing is by electron beam. Specifically, the electron beam employed is from a conventional type of equipment which provides a curtain of electrons in an inert nitrogen atmosphere. Total bombardment necessary to achieve hardening is a function of the total electron beam energy and the amount of unsaturated sites involved in the polymerization. For the best formula, discussed below, the dose is 2 megarads.

BEST FORMULA

The following formula was obtained by optimizing the results for the relatively low energy impact of a daisy wheel printer. For a longer dwell and correspondingly higher energy of a conventional typewriter, the requirements are generally less demanding. For a conventional typewriter the final ink material can be made more cohesive, as by reducing the powder, since the higher energy of impact will provide good image transfer. The coated mixture prior to curing is quite viscous and some minute ribs occur. (Ribs are lines of high ridges along the length of the coating direction, separated by lower areas or valleys.) During impact printing the ribs concentrate force somewhat and therefore tend to be more embedded. The following formula is optimized to lift all of a printed character including the rib area during correction, and therefore must be more cohesive than would be necessary for an extremely flat marking layer.

| Ingredient | Percent by Weight |
|---|---|
| Carbon Black (pH 7) | 12.6 |
| Polyperfluoroethylene Powder | 25.2 |
| N—Vinyl-2-Pyrrolidone | 25.2 |
| Acrylic acrylate (Celrad 1700 of Celanese Chemical Co.) | 16.8 |
| Mineral Oil (1000 cps viscosity) | 20.2 |

FORMULA RANGE

Formula modifications which did not tend to optimize the result for low impact printing were not pursued.

Individual elements of the formula have been considered with respect to their limits of operability for the functions which they appear to perform. These limits appear to be as follows.

| Ingredient | Percent by Weight (Functional range of each ingredient) |
|---|---|
| Carbon Black | 5-15 |
| Polyperfluoroethylene | 15-50 |
| N—Vinyl-2-Pyrrolidone | 10-30 |
| Acrylic Acrylate | 10-30 |
| Mineral Oil | 5-30 |

COATING AND BULK MANUFACTURE

Figure 2:
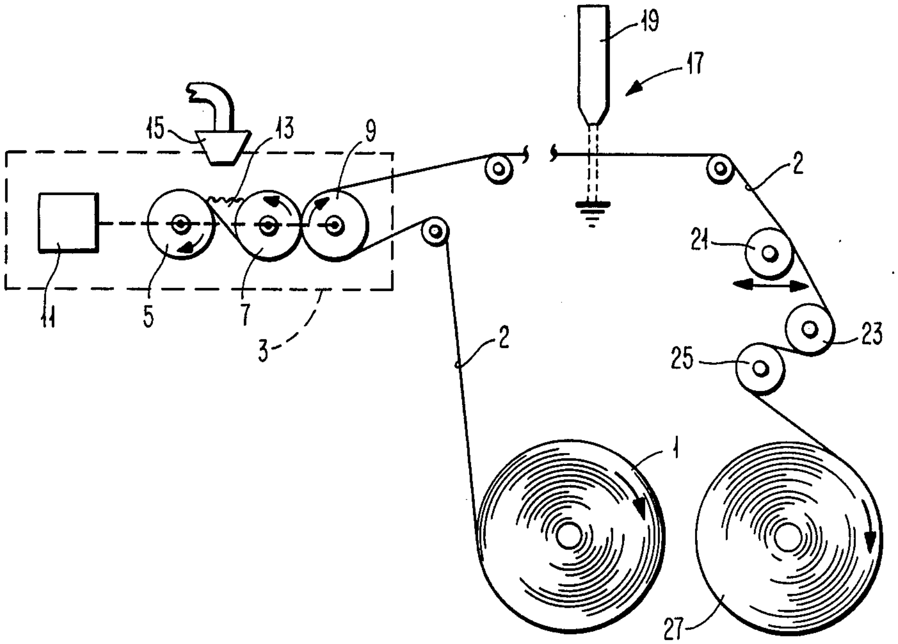
FIG. 2 illustrates the coating and forming of a bulk roll with emphasis on special coating requirements of the high viscous formula involved.

FIG. 2 illustrates the significant aspects of manufacture of a bulk roll of the preferred ribbon. As the foregoing best formula is so viscous as to be generally immobile under the influence of gravity alone, special attention to the coating operation is necessary. The best coating technique known for this purpose is illustrated in FIG. 2, in conjunction with a very general and illustrative depiction of the ramaining elements of the overall process of fabricating the transfer medium.

Roll 1 is the supply roll of high density polyethylene sheet 2 of about 10 microns in thickness. Roll 1 is unwound to feed sheet 2 through the fabrication process. Sheet 2 passes through a coating station 3.

Coating station 3 comprises a metering roll 5, which is driven clockwise, an applicator roll 7, which is driven counterclockwise, and a back-up roll 9, which is driven clockwise. The rolls 5, 7 and 9 are linked to a positively infinitely variable (PIV) gear box 11. The PIV 11 is a standard, commercially available system having a gear system which effectively resists one roller being driven by an adjoining roller. Instead, each roller is driven at a speed dictated by the PIV 11.

Rolls 5, 7 and 9 are 10 inches (about 0.254 meter) in effective width (face width). Rolls 5 and 7 are 8 inch (about 0.203 meter) outside diameter rolls of standard chrome steel (steel body coated with chromium). Roll 9 is 8 inch (about 0.203 meter) in outside diameter of rubber having a durometer measurement of 60. The three rolls 5, 7 and 9 are horizontal.

Metering roll 5 and applicator roll 7 have perimeters separated at their closest point by 0.003 inch (about 0.0000762 meter), forming a gap 13 into which material of the ink formula is injected by nozzle 15, positioned between and above rolls 5 and 7.

Applicator roll 7 is mounted to apply a pressure of 30 lbs. per inch (about 345 grams per meter) of roll face width against the sheet 2 at the nip of roll 7 and roll 9, resulting in 300 lbs. (about 3450 grams) total pressure at the face between roll 7 and roll 9.

Sheet 2 passes through coating station 3 and then extends through electron curtain station 17, having an electron beam source 19, shown entirely illustratively. Sheet 2 then passes over an automatic web guide 21 (this is a well known, commercially available element comprising a roller mounted to move laterally with the web, as suggested illustratively in the drawing). Sheet 2 then passes around two, spaced pull rolls 23 and 25, which are driven to pull sheet 2, as is conventional. Lastly, sheet 2 is wound into bulk roll 27 as a finished bulk roll 27 of the transfer medium.

Automatic web guide 21 is employed because of the difficulty in feeding a sheet of polyethylene as thin as sheet 2. In addition, for the same reason, careful tension adjustments are made manually throughout the system from coating station 3 to pull rolls 23 and 25 and bulk roll 27.

In addition to the train of three rollers 5, 7 and 9, and the turning directions described, the ratio of coating speeds is a basic element of the coating operation.

Optimum tangential velocity of the horizontal rolls is in the ratio of 3 to 10 to 70 (tangential velocity of metering roll 5 being a value which may be considered 3, tangential velocity of applicator roll 7 being more than that of the metering roll by a ratio of 10 to 3; and tangential velocity of back-up roll 9 being more than that of the metering roll by a ratio of 70 to 3). Movement of sheet 2 is controlled directly by back-up roll 9, as the rubber makes a strong frictional contact with the sheet, and sheet 2 therefore moves at the tangential velocity of roll 9.

The fastest speed achieved with satisfactory coating is with movement of sheet 2 at 70 feet per minute (about 21.3 meters per minute). In that system, the tangential velocity of back-up roll 9 is 70 feet per minute (about 21.3 meters per minute), the tangential velocity of applicator roll 7 is 10 feet per minute (about 3.04 meters per minute), and the tangential velocity of metering roll 7 is 3 feet per minute (about 0.91 meters per minute). Coating is essentially the same at slower speeds so long as the foregoing speed ratio of rolls 5, 7 and 9 is maintained.

Driving of applicator roll 7 by back up roll 9 is prevented by PIV 11. In one satisfactory vertical configuration for the coater, the optimum ratio of tangential velocities was 4 to 10 to 30 and the other settings and pressures were somewhat different.

During coating, material of the foregoing best formula is continually supplied by pressure ejection from nozzle 15. The resulting coating on sheet 2 is quickly cured to a solid under a 2 megarad dose of electron radiation at station 17, and the bulk roll 27 is ready to be slit by standard techniques.

It will be apparent that various modifications and diluents employing the same basic formula may be applied within the spirit and scope of this invention. Accordingly the following claims should measure the invention and should not be limited by any implication from the preferred forms and steps herein disclosed.

What is claimed is:

1. A lift-off correctable transfer medium having a non-polar organic supporting substrate and a layer of marking material supported on said substrate, said marking material being transferable under pressure and being sufficiently cohesive when transferred as a printed character to be lifted-off by an adhesive element, said marking material comprising a polymerized acrylic acrylate as a primary bonding material.

2. The transfer medium as in claim 1 wherein said marking material additionally comprises a polymerized N-vinyl-2-pyrrolidone as a bonding material.

3. The transfer medium as in claim 1 wherein said marking material additionally comprises a powdered polyperfluoro alkane.

4. The transfer medium as in claim 2 wherein said marking material additionally comprises a powdered polyperfluoro alkane.

5. The transfer medium as in claim 1 wherein said acrylic acrylate consists essentially of butyl acrylate monomers, methyl methacrylate monomers, and acrylated glycidyl methacrylate monomers polymerized at their unsaturated sites, said butyl acrylate being more in weight than the combined weights of said methyl methacrylate and said acrylated glycidyl methacrylate.

6. The transfer medium as in claim 5 wherein said marking material additionally comprises a polymerized N-vinyl-2-pyrrolidone as a bonding material.

7. The transfer medium as in claim 5 wherein said marking material additionally comprises a powdered polyperfluoro alkane.

8. The transfer medium as in claim 6 wherein said marking material additionally comprises a powdered polyperfluoro alkane.

9. The transfer medium as in claim 4 wherein said marking material additionally comprises mineral oil.

10. The transfer medium as in claim 4 wherein said marking material additionally comprises a powdered polyperfluoro alkane.

11. The transfer medium as in claim 5 wherein said marking material additionally comprises a powdered polyperfluoro alkane.

12. The transfer medium as in claim 6 wherein said marking material additionally comprises a powdered polyperfluoro alkane.

13. The transfer medium as in claim 7 wherein said marking material additionally comprises a powdered polyperfluoro alkane.

14. The transfer medium as in claim 10 also comprising by weight from 5 to 15 percent carbon black and having from 10 to 30 percent of said acrylate, from 10 to 30 percent of said pyrrolidone, from 15 to 50 percent of said polyperfluoro alkane, and from 5 to 30 percent of said mineral oil.

15. The transfer medium as in claim 12 also comprising by weight from 5 to 15 percent carbon black and having from 10 to 30 percent of said acrylate, from 10 to 30 percent of said pyrrolidone, from 15 to 50 percent of said polyperfluoro alkane, and from 5 to 30 percent of said mineral oil.

16. The transfer medium as in claim 12 also comprising by weight about 13 percent of carbon black and having about 17 percent of said acrylate, about 25 percent of said pyrrolidone, about 25 percent of said polyperfluoro alkane, and about 20 percent said mineral oil.

17. A transfer medium comprising a non-polar organic supporting substrate supporting a layer of marking material adapted for complete transfer from said substrate in the form of characters when said substrate is impacted by a printing element, said marking layer comprising a polymeric binder comprising an acrylate and N-vinyl-2-pyrrolidone, a polyperfluoro alkane powder, and mineral oil.

18. The transfer medium as in claim 17 also comprising by weight from 5 to 15 percent carbon black and having from 10 to 30 percent of said acrylate, from 10 to 30 percent of said pyrrolidone, from 15 to 50 percent of said perfluoro alkane, and from 5 to 30 percent of said mineral oil.

19. The transfer medium as in claim 17 also comprising by weight about 13 percent of carbon black and having about 17 percent of said acrylate, about 25 percent of said pyrrolidone, about 25 percent of said polyperfluoro alkane, and about 20 percent said mineral oil.

20. A transfer medium comprising a non-polar organic supporting substrate supporting a layer of marking material adaped for complete transfer from said substrate in the form of characters when said substrate is impacted by a printing element, said marking layer comprising an acrylate and a monomer having an N-vinyl functional group polymerized under ionizing radiation.

21. The transfer medium as in claim 20 in which said ionizing radiation is an electron beam.

22. The transfer medium as in claim 20 in which said acrylate is acrylic acrylate.

23. The transfer medium as in claim 21 in which said acrylate is acrylic acrylate.

24. The transfer medium as in claim 23 in which said acrylic acrylate consists essentially of butyl acrylate monomers, methyl methacrylate monomers, and acrylated glycidyl methacrylate monomers polymerized at their unsaturated sites, said butyl acrylate being more in weight than the combined weights of said methyl methacrylate and said acrylated glycidyl methacrylate.

25. The transfer medium as in claim 23 in which said acrylic acrylate consists essentially of butyl acrylate monomers, methyl methacrylate monomers, and acrylated glycidyl methacrylate monomers polymerized at their unsaturated sites, said butyl acrylate being more in weight than the combined weights of said methyl methacrylate and said acrylated glycidyl methacrylate.

26. The transfer medium as in claim 20 in which said monomer is N-vinyl-2-pyrrolidone.

27. The transfer medium as in claim 21 in which said monomer is N-vinyl-2-pyrrolidone.

28. The transfer medium as in claim 22 in which said monomer is N-vinyl-2-pyrrolidone.

29. The transfer medium as in claim 23 in which said monomer is N-vinyl-2-pyrrolidone.

30. The transfer medium as in claim 24 in which said monomer is N-vinyl-2-pyrrolidone.

31. The transfer medium as in claim 25 wherein said monomer is N-vinyl-2-pyrrolidone.

32. The transfer medium as in claim 20 also comprising powdered polyperfluoro alkane and mineral oil.

33. The transfer medium as in claim 21 also comprising powdered polyperfluoro alkane and mineral oil.

34. The transfer medium as in claim 22 also comprising powdered polyperfluoro alkane and mineral oil.

35. The transfer medium as in claim 23 also comprising powdered polyperfluoro alkane and mineral oil.

36. The transfer medium as in claim 24 also comprising powdered polyperfluoro alkane and mineral oil.

37. The transfer medium as in claim 24 also comprising powdered polyperfluoro alkane and mineral oil.

38. The transfer medium as in claim 32 in which said monomer is N-vinyl-2-pyrrolidone.

39. The transfer medium as in claim 33 in which said monomer is N-vinyl-2-pyrrolidone.

40. The transfer medium as in claim 34 in which said monomer is N-vinyl-2-pyrrolidone.

41. The transfer medium as in claim 35 in which said monomer is N-vinyl-2-pyrrolidone.

42. The transfer medium as in claim 36 in which said monomer is N-vinyl-2-pyrrolidone.

43. The transfer medium as in claim 37 in which said monomer is N-vinyl-2-pyrrolidone.

* * * * *